(12) United States Patent
Wiberg et al.

(10) Patent No.: US 8,368,514 B2
(45) Date of Patent: Feb. 5, 2013

(54) DEVICE FOR WIRELESS OPERATION AND METHOD FOR OPERATING THE DEVICE

(75) Inventors: Per-Arne Wiberg, Halmstad (SE); Urban Bilstrup, Traslovslage (SE)

(73) Assignee: LeptonRadio AB (SE)

( * ) Notice: Subject to any disclaimer, the term of this patent is extended or adjusted under 35 U.S.C. 154(b) by 856 days.

(21) Appl. No.: 12/439,189

(22) PCT Filed: Sep. 3, 2007

(86) PCT No.: PCT/SE2007/000768
§ 371 (c)(1),
(2), (4) Date: Feb. 27, 2009

(87) PCT Pub. No.: WO2008/026988
PCT Pub. Date: Mar. 6, 2008

(65) Prior Publication Data
US 2009/0207037 A1   Aug. 20, 2009

Related U.S. Application Data

(60) Provisional application No. 60/846,270, filed on Sep. 21, 2006.

(30) Foreign Application Priority Data

Sep. 1, 2006   (SE) ...................................... 0601807

(51) Int. Cl.
*H04Q 5/22* (2006.01)
(52) U.S. Cl. ...................... 340/10.1; 340/10.2; 340/10.3; 340/10.4; 340/10.5; 340/572.1; 340/572.2; 340/572.3; 340/572.4; 340/572.5; 340/572.6; 340/572.7; 235/375; 235/376; 235/377; 235/378; 235/385; 455/343.1
(58) Field of Classification Search ........ 340/10.1–10.5, 340/572.1–572.9; 235/375–385; 455/343.1
See application file for complete search history.

(56) References Cited

U.S. PATENT DOCUMENTS

| | | | |
|---|---|---|---|
| 2004/0145452 A1 | 7/2004 | Fischer et al. | |
| 2006/0276161 A1* | 12/2006 | Twitchell | .................... 455/343.1 |
| 2007/0236851 A1* | 10/2007 | Shameli et al. | ................ 361/113 |

FOREIGN PATENT DOCUMENTS

| | | |
|---|---|---|
| GB | 2316274 A | 2/1998 |
| WO | 9608086 A1 | 3/1996 |
| WO | 0165481 A1 | 9/2001 |
| WO | 0167625 A1 | 9/2001 |

OTHER PUBLICATIONS

International Search Report for PCT/SE2007/000768.

* cited by examiner

*Primary Examiner* — George Bugg
*Assistant Examiner* — Ojiako Nwugo
(74) *Attorney, Agent, or Firm* — Brooks Kushman P.C.

(57) ABSTRACT

An electronic device and a method of operating the device. The device receives a first signal having a first frequency and a predetermined signal strength and retransmits a signal after a latency period and during a time period. The device comprises an oscillation circuit operating in a sub-threshold area in a meta-stable, first mode of operation. When the first signal is received, the oscillation circuit is trigged and passes to an active mode in a second mode of operation, wherein the circuit oscillates. Finally, the device is reset to the first mode of operation. The device may have an identity, which is used for the purpose of the system, which may be an RFID system.

18 Claims, 7 Drawing Sheets

DEVICE FOR WIRELESS OPERATION AND METHOD FOR OPERATING THE DEVICE

CROSS-REFERENCE TO RELATED APPLICATION

This application claims the benefit of U.S. provisional application Ser. No. 60/846,270 filed Sep. 21, 2006.

AREA OF INVENTION

The present invention relates to a device for wireless operation and a method for operating the device. More specifically, the device may be an identification member in a system, such as a wireless article surveillance system.

BACKGROUND OF INVENTION

Devices operated wirelessly have been used for a long time. Batteries may power such devices. However, batteries have limited capacity and lifetime. In order for the batteries to last long, the devices are designed for as small power consumption as possible.

An article surveillance system uses several identification tags attached to the articles of the system. Readers are arranged to detect the presence and identity of such tags within the coverage area of the reader.

An intrusion alarm system uses several sensors arranged to detect unauthorized persons adjacent the sensor. A central system is alerted if a sensor is trigged.

A temperature monitoring system of a building comprises several temperature sensors arranged to detect the temperature adjacent the sensor. A central computer polls the sensors intermittently for receiving temperature values. The sensors may as well detect humidity and other data, such as mains power consumption or light conditions (night or day light).

Such systems have in common that a plurality of battery-powered devices are included in the system. The devices may be operated intermittently or continuously for delivering data to a central system. Other systems than those described above may also benefit from the present invention.

The device may be "sleeping" for a long time, such as in article surveillance systems, wherein an identification tag is attached to an article during manufacture and may reside on the article during transport and storage during months and years, until used by the system at the time of selling the article.

Thus, there is a need for a battery-powered device having a very low power drain during a "sleep" mode and which can be activated at an arbitrary time by a predetermined signal. Moreover, there is a need for a device having an identity and possibly data that can be detected by a remote system.

WO 01/67625 discloses a transponder for amplification of a received signal to a signal for retransmission, wherein a quenched oscillator is incorporated as an amplifying element. The oscillator is preferably of the superregenerative type and exhibits negative resistance for the received signal.

WO 96/08086 discloses a micropower transponder that employs a superregenerative receiver wherein the quench oscillator is external to the regenerative transistor. The quench oscillator applies en exponentially decaying waveform rather than the usual sinewave to achieve high sensitivity at microampere current levels.

DISCLOSURE OF INVENTION

Accordingly, the present invention preferably seeks to mitigate, alleviate or eliminate one or more of the above-identified deficiencies and disadvantages in the art singly or in any combination.

According to one aspect of the invention, there is provided a method of operating an electronic device, comprising: initially operating the device in a meta-stable, first mode of operation; operating the device in an oscillating, second mode of operation, wherein the device oscillates at a predetermined oscillation frequency; transferring the device from said first mode of operation to said second mode of operation by means of a signal having a predetermined signal frequency and power level and being input to an input terminal of the device; and terminating the second mode of operation and transferring said device to said meta-stable, first mode of operation. The transferring of the device from said first mode of operation to said second mode of operation may take place after a latency period after inputting said signal. The signal may be a signal received by an antenna. The signal frequency may be offset from the oscillation frequency of the device.

In an embodiment, the device is in a sub-threshold area of operation in the meta-stable, first mode of operation. The oscillation frequency may be adjustable.

In another embodiment, the method may further comprise the activation of a control circuit at the transferring from the first mode of operation to the second mode of operation.

In another aspect, there is provided an electronic device, comprising: an amplification member and a filter member connected to form an oscillation circuit; a bias circuit for maintaining the oscillation circuit in an inactive, meta-stabile, first mode of operation, having low power dissipation; an input circuit for inputting a signal to said amplification member for transferring said device into a second mode of operation, wherein the device oscillates at a predetermined oscillation frequency; and a reset circuit for resetting said device to said first mode of operation. The input circuit may comprise an antenna.

In an embodiment, the filter member may comprise at least one inductor and at least one capacitor. The filter member may be adjustable.

In another embodiment, the device may further comprise a control circuit adapted to be activated at the transferring from said first mode to said second mode. The control circuit may control the reset circuit. A second electronic device may be connected to the control circuit. The second electronic device may have a different oscillation frequency than the first electronic device.

The device may be used in an article surveillance system comprising a reader and several identification tags.

BRIEF DESCRIPTION OF DRAWINGS

Further objects, features and advantages of the invention will appear from the following detailed description of embodiments of the invention, reference being made to the accompanying drawings, in which.

DETAILED DESCRIPTION OF EMBODIMENTS

The embodiments described below disclose the best mode and enables a skilled person to carry out the invention. The different features of the embodiments can be combined in other manners than described below. The invention may be embodied in many different forms and should not be construed as limited to the embodiments set forth herein. Rather, these embodiments are provided so that this disclosure will be thorough and complete, and will fully convey the scope of the invention to those skilled in the art. The invention is only limited by the appended patent claims.

Figure 1:
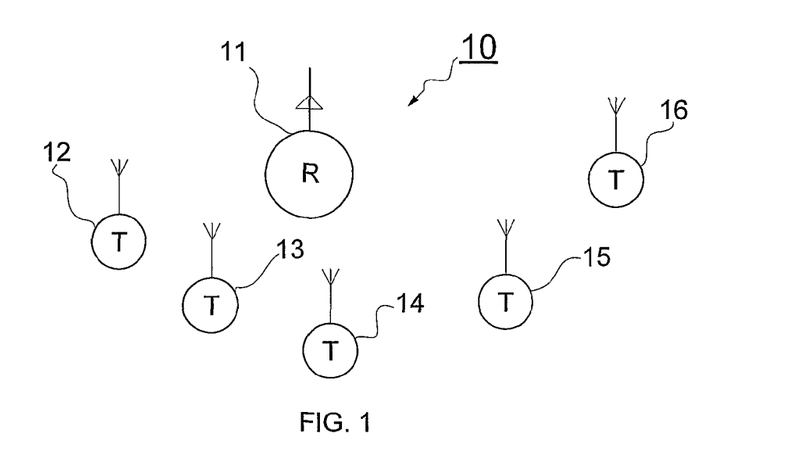
FIG. 1 is a schematic diagram of an RFID system in which the invention may be used.

FIG. 1 is a schematic view showing an RFID system 10 comprising a reader 11 and several tags 12, 13, 14, 15, 16. Although five tags are shown, such systems may comprise a great number of tags, some of which are within the range of a specific reader 11.

The reader 11 comprises a transceiver (transmitter/receiver), which transmits a radio signal having predetermined frequencies and listens for response signals from the tags.

The tag may be of different configurations depending on the system.

The tag may be a passive device having selective absorption of energy, for example at said predetermined frequency. The reader 11 may sense the absorption and determine a property of the tag. The passive device needs no power supply.

A more versatile, active tag comprises a receiver and a transmitter. The receiver is a low power receiver, which (intermittently) listens to radio signals transmitted by the reader. The tag is activated at regular intervals and when the receiver senses a radio signal, for example in a predetermined frequency interval, a power source is connected to the transmitter for sending a reply. The reply may be an acknowledgment signal and/or may include some information, such as the identity of the tag and/or further data. The internal power source may be supplemented by power obtained from the radio signal transmitted by the reader. Such a tag needs an internal power source, but the power consumption may be very low in stand-by mode. However, the receiver is activated at regular or controlled intervals even if there is no reader within reach, thereby consuming power.

The tag may have an identity and may respond to the reader only if the identity matches a signal transmitted by the reader. Such an identity may be a series of frequencies transmitted by the reader. The reader may be arranged to transmit signals at different frequencies in a frequency band, for example frequencies f0 to f79 included in a free band in the 2.4 GHz area that is open to low power appliances. Such frequency band can include 80 bands with a frequency distance of 1 MHz, compare the Bluetooth® standard. The reader may for example transmit the frequency series of f1, f5, f33, f2 and the tag having the identity vector (1, 5, 33, 2) will be activated and send a reply, see FIG. 9.

The tag is produced in great quantities and should be as inexpensive as possible. Thus, there is a demand for a design that is as simple as possible. Moreover, the power consumption should be minimized so that small batteries can be used. The battery should last over the total life cycle of the product, which can be, for example, 5 years or more.

Figure 2:
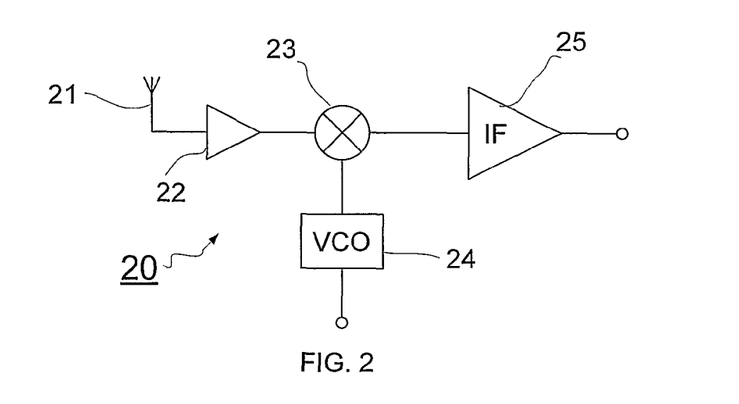
FIG. 2 is a schematic diagram of a previously known identification tag used in the RFID system of FIG. 1.

The receiver of the tag has according to prior art been constructed as a heterodyne receiver, as shown in FIG. 2. The tag 20 comprises an antenna 21 connected to a broadband amplifier 22 having an output that is connected to a mixer 23. The signal from the antenna is mixed with a signal having a predetermined frequency from an oscillator 24, such as a VCO, a voltage controlled oscillator. The difference signal from the mixer 23 is fed to a narrow-band, intermediate frequency IF amplifier 25 and the amplified signal is delivered to an output terminal, which is connected to some evaluation circuit, not shown. Thus, the frequency of the VCO 24 determines which antenna signal frequency that is amplified by the IF amplifier 25. However, the power consumption of such a receiver is relative large. Activating the receiver only during short time periods with long intervals reduces the power consumption of the tag 20. However, if the time interval is too long, the tag may risk missing a reader signal.

Figure 3:
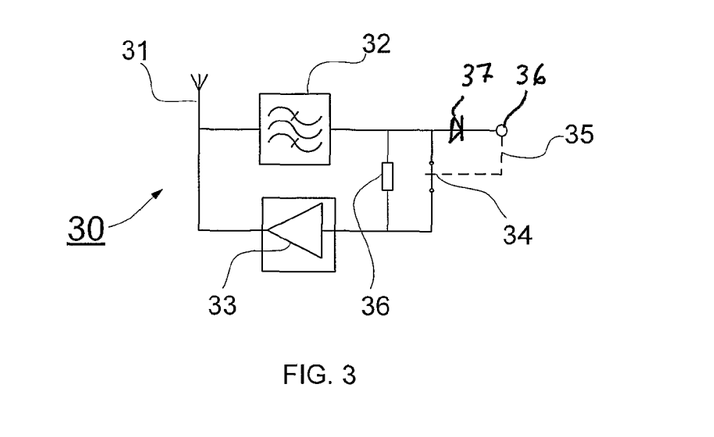
FIG. 3 is a schematic diagram of an embodiment of a device according to the invention.

FIG. 3 shows an embodiment of an active tag comprising a non-linear amplifying member. The tag 30 comprises an antenna 31 connected to a band-pass filter 32, which may be an inductance connected in series with a capacitance. An amplifier 33 is connected across the band-pass filter. The amplifier 33 may be a threshold amplifier, in which the signal has to be above a specific threshold value in order to be amplified. When the signal from the antenna 31 is above said threshold value, after filtration by the filter 32, the signal is amplified by the amplifier 33 and fed back to the input of the filter 32 as a still larger signal. The amplifier 33 is connected with positive feedback and the amplifier 33 will enter into oscillation within a short time period, called a latency period. The oscillations produce a signal that is broadcasted by the antenna 31. The reader 11 may sense this broadcasted signal as a response. The signal produced by the amplifier 33 is emitted at an output 36 via a diode 37 to a control circuit of the tag 30. At the same time, the output signal controls a switch 34 in the feedback loop of the amplifier 33 via a control line 35. When the oscillation signal is sufficiently large, the switch 34 is opened and connects a resistor 36 into the feedback loop, which causes the oscillations to cease.

Thus, the tag 30 according to FIG. 3 produces an oscillation signal when the antenna 31 receives a signal having a specific frequency and sufficient signal strength. This oscillation signal continues until interrupted by the switch 34. Thus, the reader 11 may send a signal for a short time period and then listen for signals having the same or similar frequency. If such a signal is sensed after the reader signal has ceased, this indicates that a tag 30 responsive to substantially that frequency is present within the range of the reader 11.

Figure 4:
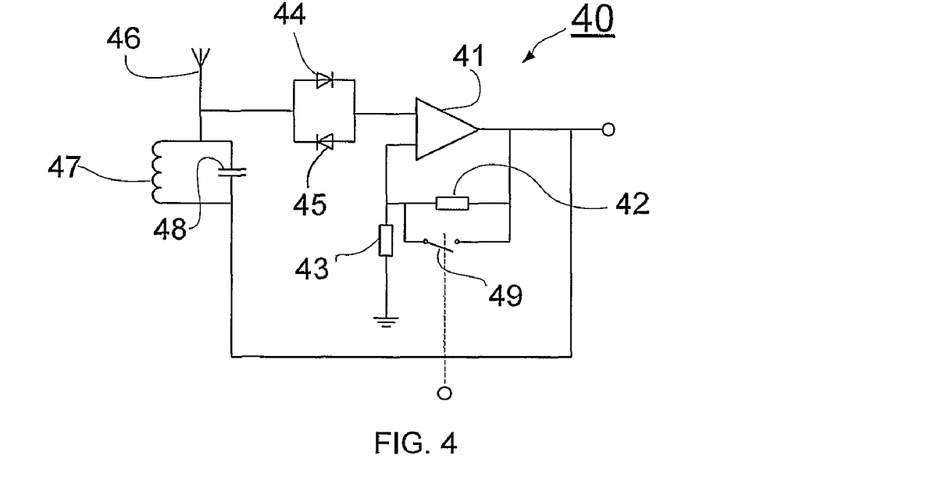
FIG. 4 is a more detailed schematic diagram of the device according to FIG. 3.

FIG. 4 shows a more detailed embodiment of a tag 40 constructed according to the principle discussed in connection with the embodiment of FIG. 3. The tag 40 comprises an amplifier 41, the amplification of which is determined by two resistors 42 and 43, which are connected between the output of the amplifier and the negative input and the ground. The amplification may for example be set to about 10 times. Two diodes 44, 45 connected in parallel and in opposite directions are connected to the positive input of the amplifier 41. The other end of the diodes 44, 45 are connected to an antenna 46 and to a LC-tank circuit comprising an inductor 47 and a capacitor 48 tuned to a specific frequency.

The tag circuit according to FIG. 4 operates as follows. Any signal on the antenna 46 will be short-circuited to the ground via either the inductor 47 or the capacitor 48 and the output of the amplifier 41, which is at ground potential. However, a signal at the resonance frequency of the LC-circuit will cause the LC-circuit to oscillate. If the signal strength from the antenna 46 at said resonance frequency exceeds a predetermined value set by a knee-voltage of the two diodes 44, 45 (such as about 0.8 Volt), the signal passes to the positive input of the amplifier 41 and is amplified by the amplifier 41 and fed back to the positive input via the LC-circuit. The positive feedback causes the circuit to oscillate with an amplitude only limited by the feed voltage of the amplifier 41. The oscillations are broadcasted by the antenna 46. A switch 49 is connected across resistor 42. If the switch 49 is closed, the amplification of the amplifier 41 is heavily reduced and the oscillations will cease. A circuit not shown in FIG. 4, controls the switch 49.

Figure 5:
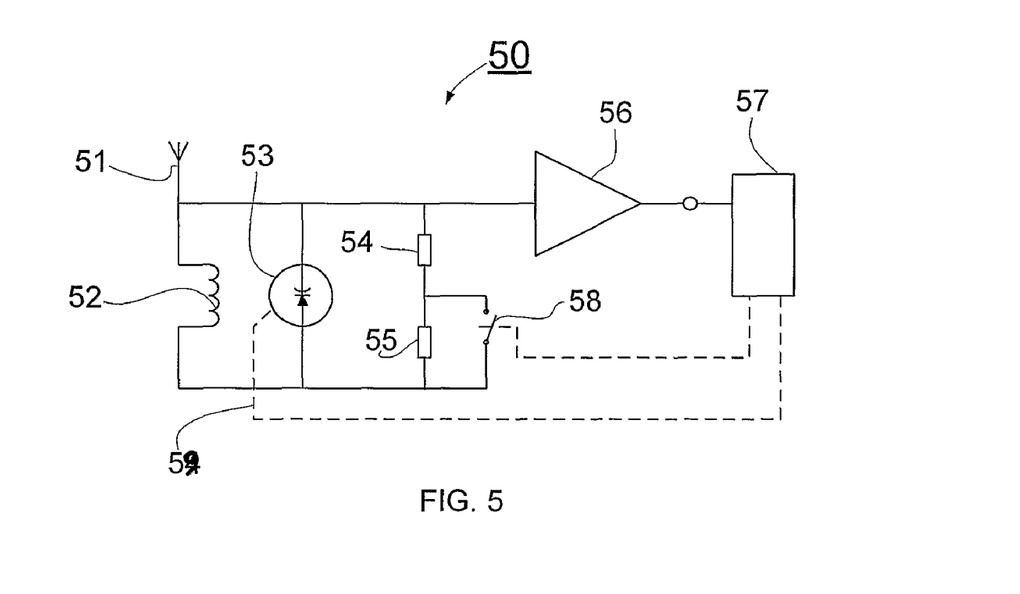
FIG. 5 is a detailed schematic diagram of a device according to another embodiment.

FIG. 5 discloses a more general circuit diagram of a tag 50. The circuit comprises an antenna 51 connected to a tank circuit comprising an inductor 52 and a variable capacitor or varactor 53. A voltage at a control line 59 controls the capacitance. The tank circuit includes a first resistor 54 (R), which mainly comprises the resistance of the wires of the inductor. A circuit 55 forming a negative resistance (−r) is connected in series with the first resistor 54. An amplifier similar to that shown in FIG. 4 may form a negative resistance. The negative resistance 55 is variable in dependence on the voltage over the resistance; a high voltage results in a higher value of the negative resistance. When the voltage is sufficiently high, the negative resistance outweighs the first resistance, and the circuit starts to oscillate. The antenna 51 broadcasts the oscillations. A threshold circuit 56 connected to a control circuit 57 also senses the oscillations. The control circuit 57 emits signals to the varactor 53 and to a reset switch 58 connected across the negative resistance 55. When the switch 58 is closed, the oscillations cease. Moreover, the control circuit generates a voltage controlling the varactor 53 over control line 59, as will be described in more details below.

Figure 6:
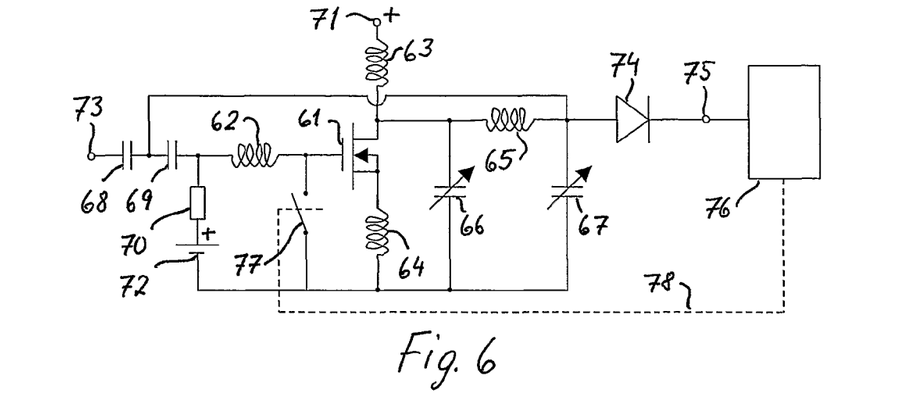
FIG. 6 is a detailed schematic diagram of a circuit according to a further embodiment.

FIG. 6 is a more detailed schematic diagram of an amplifier 60 with voltage dependent amplification, a varamplifier. The amplifier 60 comprises one FET transistor 61 four inductors 62, 63, 64, 65, two variable capacitors 66, 67, two isolation capacitors 68, 69 and a resistor 70 connected to form an oscillator. A positive feed voltage is connected to a voltage terminal 71 at one end of inductor 63. A bias voltage source 72 is connected to the gate of the transistor 61 via the resistor 70 and the inductor 62. An antenna signal is connected to an antenna terminal 73. A diode 74 provides an output signal via an output terminal 75 to a control circuit 76. A reset switch 77 is controlled by the control circuit via control line 78

During normal operation, with no input signal at the antenna terminal 73, resistor 70 and the voltage source 72 maintains the gate of the FET transistor 61 below a knee voltage of the transistor and practically no current passes through transistor 61. The circuit is in an idle position or meta-stable position draining practically no current from the power supply.

Figure 7:
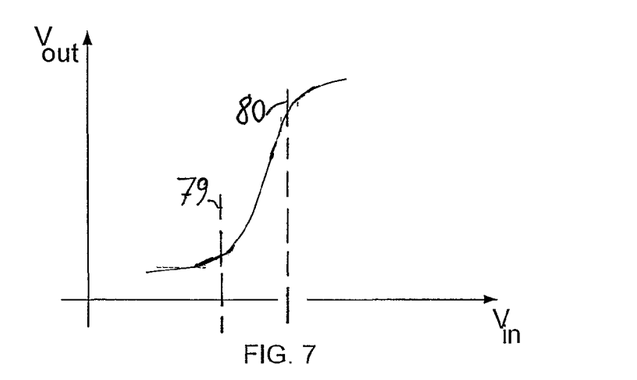
FIG. 7 is an amplification diagram of the non-linear amplifier in the embodiments of FIG. 6.

The transistor 61 is in a position 79 on an amplification diagram shown in FIG. 7, in which the amplification is below "one". This is called the first mode of operation, which takes place in a sub-threshold area of the operational diagram of the transistor. In this area, the power or current consumption of the transistor is very low and the amplification of the transistor is also low or below "one".

However, if a signal appears at the antenna terminal 73 having an amplitude or power sufficient to pass the transistor over the knee voltage, indicated by line 79, and into the area in which the amplification is above "one", the transistor 61 starts to draw current. Then, the circuit starts to oscillate at the frequency determined by the inductor 65 and the capacitors 66 and 67. The oscillations will cause the circuit to enter the saturation area indicated by line 80 of FIG. 7. This is called the second mode of operation, in which oscillations take place at a specific resonance frequency.

The circuit will resonate for antenna signals selected by the circuit comprising the inductor 65 and the capacitors 66, 67 tuned to a resonance frequency (f1). Such resonating signals will trigger the transistor 61 and start oscillations.

An output signal from the transistor 61 is fed to a control circuit 76, which controls a switch 77 via line 78 for resetting the circuit and preventing further oscillations.

Thus, the circuit shown in FIG. 6 in the first mode operates in the sub-threshold area of the transistors 60, 61, wherein practically no power consumption takes place. Only when an antenna signal is received as described above, the circuit starts to consume power in the second mode of operation. Thus, the circuit is always actively listening for radio signals, without draining the power supply.

The circuit of FIG. 6 may be said to have a meta-stable first operation mode, because the amplification in the positive feedback loop is below "one". Thus, the circuit may stay in the meta-stable first operation mode for an indefinite time duration. Metastability in electronics is defined as the ability of a non-equilibrium electronic state to persist for a long and theoretically unlimited period of time.

When a signal above a certain amplitude or power is received, the circuit becomes instable. The amplification increases to above "one", and the circuit starts to oscillate in the second mode. The circuit is pushed into oscillations with rapidly increasing amplitude. However, the "push" may take some time, until the oscillations start, called a latency period. Thus, the reply time of the circuit may be in the area of part of or some microseconds, until the circuit has started to oscillate.

It is noted that an antenna signal with a frequency outside the predetermined centre frequency will still trig the circuit if it is close enough and has sufficiently high signal strength.

Figure 8:
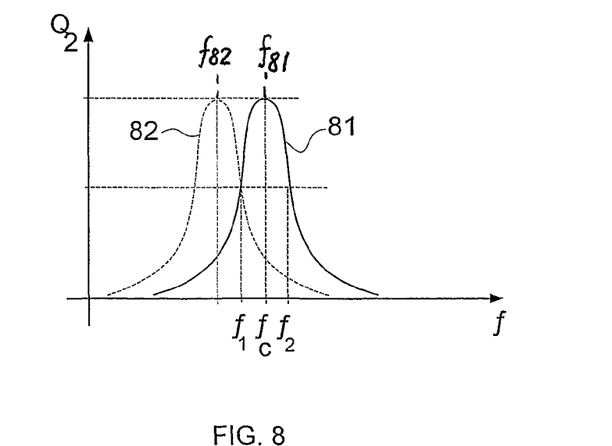
FIG. 8 is a diagram of the band-pass property of a band-pass filter in the embodiment of FIG. 6.

FIG. 8 shows a diagram of the Q-value of the circuit of FIG. 5 or FIG. 6. At the centre frequency, the Q-value is for example "two" when the circuit is in the area with maximum amplification of the circuit, i.e. on the operation area between lines 79 and 80 in FIG. 7. Thus, with an excitation frequency of fc, the circuit will start to oscillate relatively rapidly. However, if the excitation frequency is in the frequency band between f1 and f2, the circuit will still start to oscillate (possibly with longer latency period and with a higher required input power), because the amplification will be above "one". However, as soon as the oscillations are initiated, the oscillation frequency will shift towards the centre frequency fc. This feature can be used and is called dissonance below.

Suppose that the reader transmits a signal having a frequency f1, which is on the 3 dB line of the response curve 81, shown in FIG. 8. Then, any tag having a frequency band including the reader frequency will start to oscillate and broadcast a signal. The signal broadcasted will be the centre frequency of the tag. Thus, when the reader may transmit a signal having a frequency f1, as indicated in FIG. 8, a tag having the frequency response 81 of FIG. 8 will start to oscillate around a frequency f81 and a tag having a frequency response 82 of FIG. 8 will start to oscillate around a frequency f82.

The centre frequency fc of a tag may be set from the start or may be adjustable, for example as indicated in FIG. 6. A variable capacitor or a variable inductor may be used for tuning the circuit. A variable capacitor or varactor is well known and comprises a diode in which the width of the barrier layer between the p-doped and n-doped areas is controlled by a gate voltage.

A variable inductor or capacitor may also be constructed by using one or several switches for including one or several inductors or capacitors in the LC circuit. The switches may be controlled during or before operation. For example, the LC circuit may be tuned to the reader frequency f1 from the start and when a signal indicating oscillation is present on the output 75, another parallel capacitor may be switched into the circuit shifting the oscillation frequency to a lower value (f82), or another series capacitor may be switched into the circuit shifting the oscillation to a higher value (f81).

Alternatively, the control circuit may adjust the LC circuit before operation to an expected reader transmission frequency. After the receipt of the reader signal and oscillation, the control circuit resets the oscillator. Then, the control circuit may shift the LC circuit to a new expected frequency from the reader, as will be explained in more detail below.

Figure 9:
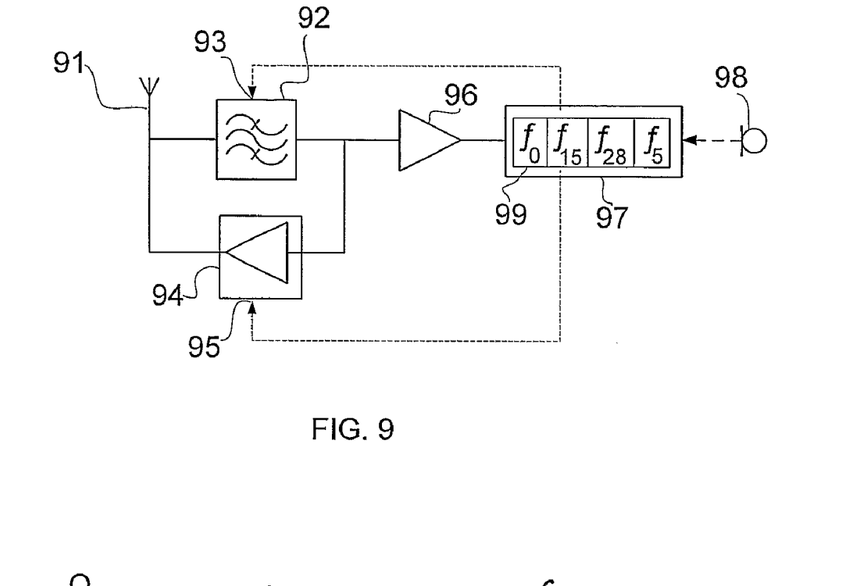
FIG. 9 is a schematic diagram of a device according to a still further embodiment.

FIG. 9 discloses a tag circuit to be used for explaining the operation below. The circuit comprises an antenna 91 providing signals to a selective filter circuit 92 having a resonance frequency which is adjustable by a voltage at a terminal 93. The signals selected by the filter circuit 92 are passed to an amplifier 94 having an adjustable amplification. The amplification is adjustable by a voltage at terminal 95. Moreover, the amplification is dependent on the input signal strength as explained above. The filter 92 and the amplifier 94 form an oscillator. When the oscillator oscillates, a signal appears at the output of the filter, and this signal is sensed by a comparator 96, which may be an amplifier similar to amplifier 94, but without oscillation capability. The output signal of comparator 96 is fed to a control circuit 97, which may produce an output signal to terminal 93 to control the resonance frequency and an output signal to terminal 95 to reset amplifier 94. Moreover, a sensor or other input device 98 provides input signals to the control circuit 97.

It is noted that the circuitry including the comparator 96 can be made in the form shown in FIG. 6 requiring almost no power during stand-by operation. The control circuit can be allowed to drain more power from the battery, since it is only activated at the request of the reader.

The control circuit comprises a register 99 comprising a series of frequencies that identifies the tag and is unique for each tag.

The operation of the reader 11 for identifying the presence of a specific tag may be the following: The tag may have an identity vector (0, 15, 28, 5) determined by a sequence of frequencies f0, f15, f28, f5. The identity vector is shown to have four members, but any number of members larger than two can be used. The reader wants to know if a tag with the specific tag identity is within the reach of the reader.

The reader 11, see FIG. 1, transmits a signal with a first frequency f0 (activation frequency). All tags comprise this frequency as the first (idle) frequency. Thus, all tags within the reach of the reader receives a signal of sufficient strength to trigger the oscillator and all tags sends a retransmission signal during a time period, whereupon the oscillations are reset by each tag. At the same time, the control circuit is activated and shifts the resonance frequency of the filter to the second frequency of the tag determined by its identity vector, in this case f15. Another tag within the reach of the reader shifts its frequency to its own second frequency determined by its identity vector.

If the reader receives at least one retransmitted signal, this indicates that at least one tag is within the reach of the reader. Often, several retransmitted signals are received.

Then, the reader 11 sends a second signal at the second frequency f15 of the desired tag. A tag having this frequency will be triggered and start to oscillate. This causes the control circuit of the relevant tag to reset the oscillations and shift the resonance frequency of the filter to a third frequency f28 of the tag. For all tags that do not have f15 as the second identity frequency, the control circuit will not receive any signal during the second sending, resulting in that the control circuit shifts the resonance frequency of the filter to the first frequency f0, whereupon the control circuit is deactivated. If the reader receives at least one retransmitted second signal, this indicates that at least one tag having f15 as the second identity frequency is within the reach of the reader 11. Several retransmitted signals may be received.

Then, the reader 11 sends a third signal at the third frequency f28 of the tag. A tag having this frequency and not being deactivated by its control circuit will be triggered and start to oscillate. This causes the control circuit of the relevant tag to reset the oscillations and shift the resonance frequency of the filter to the fourth frequency of the tag. For all tags that do not have f28 as the third identity frequency, the control circuit will not receive any signal during the third sending, resulting in that the control circuit shifts the resonance frequency of the filter to the first frequency f0, whereupon the control circuit is deactivated. If the reader receives at least one retransmitted third signal, this is an indication that at least one tag having f15 as the second identity signal and f28 as the third identity frequency is within the reach of the reader. Several retransmitted signals may be received.

Finally, the reader 11 sends a fourth signal having a fourth frequency f5 of the tag. A tag having this frequency and not being deactivated by the control circuit will be triggered and start to oscillate. This causes the control circuit of the relevant tag to reset the oscillations. Only one tag has this combination of frequencies. If that tag is within the reach of the reader 11, the reader 11 will receive a retransmitted signal from only that tag. The control circuit will have disabled all other tags within the reach of the reader by shifting the resonance frequency of the filter to the first frequency f0.

The reader may now send further signals to the identified tag, for example for reading values of an input signal provided by sensor 98, which may be a temperature sensor or any other device. Such polling of the relevant tag can take place at any frequency, which is not the first frequency f0.

In another situation, the reader may be unaware of the identity of a tag within the reach of the reader. Then some type of arbitration is required for the reader to obtain information about the identity of the tags within the reach area of the reader. This may take place as follows:

The method uses the principle of dissonance, meaning that the tag responds at a frequency, which slightly deviates from the reader frequency with a difference frequency $\Delta f1$ or $\Delta f2$.

Figure 11:
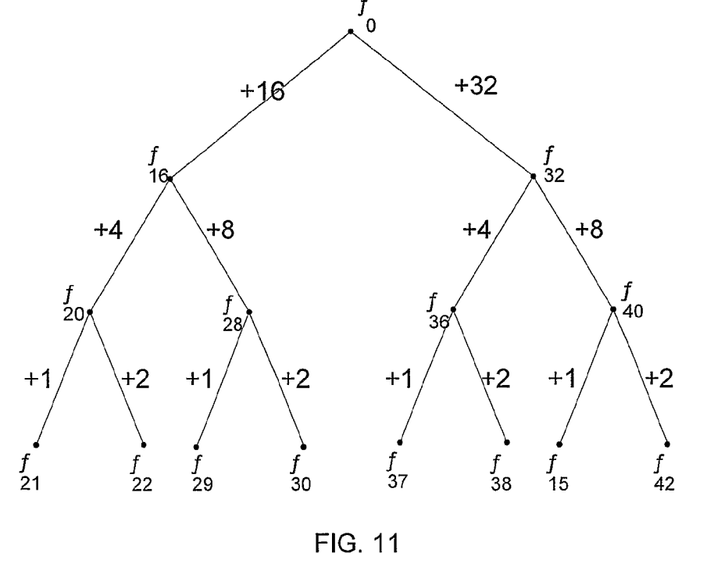
FIG. 11 is a diagram similar to FIG. 10 of another frequency selection scheme.

Firstly, the reader transmits a signal at an activation frequency f0, see FIG. 11. All tags are initially tuned so that this frequency is within the pass-band of the circuit. Thus, all tags within the reach of the reader respond at a frequency that is f0 plus $\Delta f1$ or $\Delta f2$. If the reader receives a frequency of f0 plus $\Delta f1$, it shifts its frequency to a second frequency, which is f16. If the reader receives a frequency of f0 plus $\Delta f2$, it shifts its frequency to a second frequency, which is f32. If both signals are received, the reader chooses any one of f16 or f32. The non-responding tags are deactivated by its control circuit.

Then, the reader transmits a second signal at f16 (or f32), whereupon all tags tuned to this frequency respond. If the reader receives a frequency of f16 plus Δf1, it shifts its frequency to a second frequency that is f20 (16+4). If the reader receives a frequency of f16 plus Δf2, it shifts its frequency to a second frequency that is f24 (16+8). If both signals are received, the reader chooses any of f20 or f24. The non-responding tags are deactivated by its control circuit.

Then, the reader transmits a third signal at f20 (or f24), whereupon all tags tuned to this frequency respond. If the reader receives a frequency of f20 plus Δf1, it shifts its frequency to a second frequency, which is f21 (16+4+1). If the reader receives a frequency of f20 plus Δf2, it shifts its frequency to a second frequency, which that is f22 (16+4+2). If both signals are received, the reader chooses any one of f21 or f22. The non-responding tags are deactivated by its control circuit.

Finally, the reader 11 transmits a fourth signal at f21 (or f22), whereupon all tags tuned to this frequency respond. If the reader 11 receives a frequency of f21 plus fΔ1 or f21 plus fΔ2, the reader will detect this.

Now, the reader 11 has four bits, which define the tag (f21) that has responded to all frequencies. Now, the reader 11 may poll the tag at a selected frequency, which may be f21 or any other frequency.

Then, the reader may continue with the frequencies where it has received double responses. In this way, the identity of the other tags can be detected.

The sensor values can be detected with dissonance, by allowing the sensor value to influence upon the difference frequency.

Figure 12:
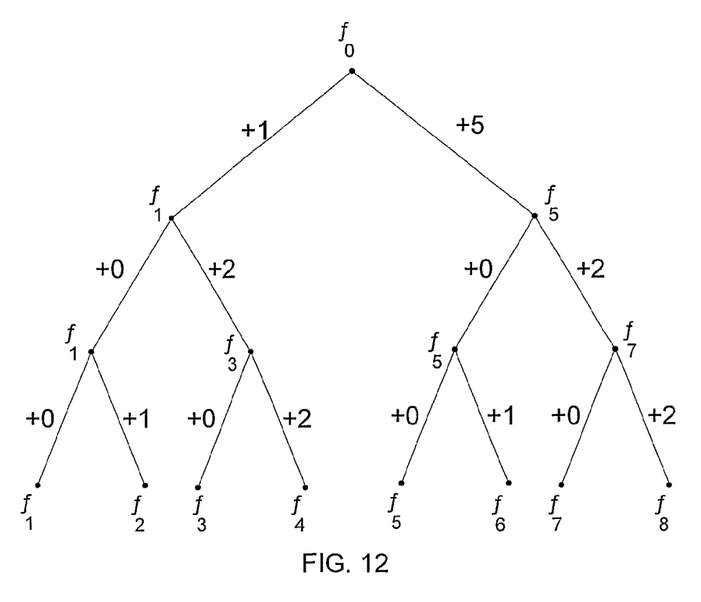
FIG. 12 is a diagram of a band-pass filter of the device according to any of the above embodiments.

Other frequency schemes may be used, such as f0 as first frequency, f1 or f5 as second frequency, f1, f3, f5, f7 as third frequency and f1, f2, f3, f4, f5, f6, f7, f8 in order to arbitrate between tags having f1-f8 as identity frequency, see FIG. 12. In this case, the same frequency f1 is used in the second, third and fourth steps, which is possible because the non-responding tag is deactivated by its control circuit.

Figure 10:
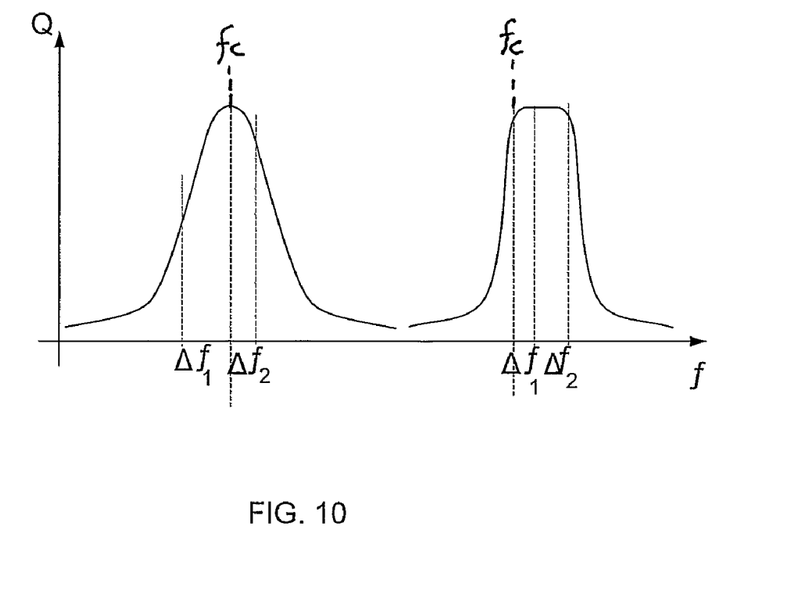
FIG. 10 is a diagram of selection of frequencies.

The responding frequencies may be arranged as shown in FIG. 8 with Δf1=minus Δf2 so that the two responding frequencies are centred on the triggering frequency fc. However, the detection of the responding frequencies at the reader may be difficult in this situation. Thus, an arrangement wherein Δf1 is different from Δf2 would possible, such as Δf1=minus 0.8*Δf2, see FIG. 10. Another arrangement would be that both responding frequencies are above or below the triggering frequency fc, such as Δf1=Δf2 or Δf1=0.8*Δf2.

More than two resonance frequencies may be used, such as three or four or more, Δf1, Δf2, Δf3, Δf4 . . . . The factor 0.8 could be another factor between 0 and 1. The limitation is that all frequencies should be within the pass-band of the filter.

The filter has been shown as a LC circuit comprising an inductor and two capacitors. However, any filter circuit can be used having a resonance frequency, i.e. a band-pass filter. Such filters can include MEMS circuits, a crystal filter, ceramic filters, LC-filters with more than three components, active filters.

Figure 13:
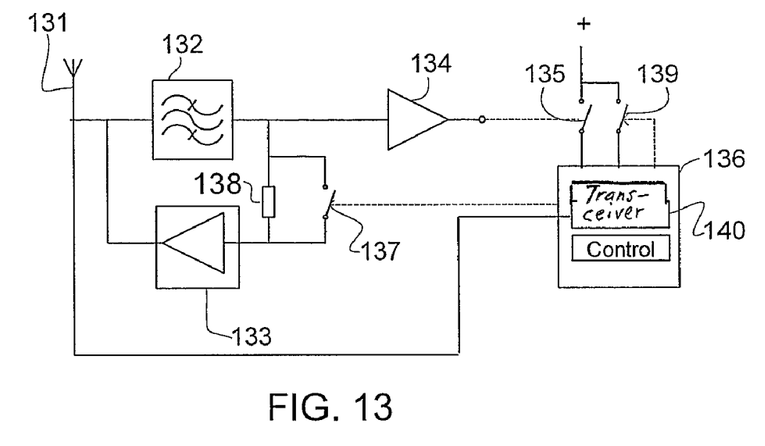
FIG. 13 is a schematic diagram of a device including a "wake-up" feature.

In another embodiment, the receiver device shown may be used only for "wake-up" of the tag. This embodiment is shown in FIG. 13. The device comprises an antenna 131. A band-pass filter 132 and a non-linear amplifier 133 are connected to form an oscillator, which starts to oscillate when the signal from the antenna is sufficiently large for starting the oscillations. A comparator senses the oscillations and controls a switch 135, which may switch on the power supply to control circuit 136. The control circuit emits a signal to the oscillator to deactivate the oscillations by opening a switch 137 thereby including a resistor 138 in the oscillating circuit, whereby the oscillations cease. At the same time, the control circuit closes another switch 139 to the power supply of the control circuit. The control circuit 136 comprises another transceiver 140 according to any known principle, such as a heterodyne receiver, which takes over the continued operation of the tag. The transceiver is connected to the antenna 131. When the operation is finalized according to any algorithm, the control circuit deactivates itself by opening the switch 139 (switch 135 is open), and the tag returns to the first mode of operation awaiting a new wake-up signal at the predetermined frequency.

The reader may transmit a single frequency signal or a broadband wake-up signal comprising several frequencies or a band of frequencies, such as a "Dirac" pulse. The tags that receive a signal at the predetermined frequency of sufficient signal strength will wake up. In this way, the tag will be in a low-power mode during a long time, until a wake-up signal is received. If a spurious wake-up signal is received, the tag will only wake up for a very short time, until the control circuit has verified that the wake-up signal was not a valid wake-up signal issued by a reader.

The reader may transmit a wake-up signal comprising a Bluetooth® enquiry sequence of frequencies as a wake-up signal. In this case, the embodiment according to FIG. 9 can be used for analyzing the Bluetooth® signal. If a correct sequence of signals is received, the control circuit is activated and takes over the control, for example according to any previously known method or any embodiment described herein above.

Figure 14:
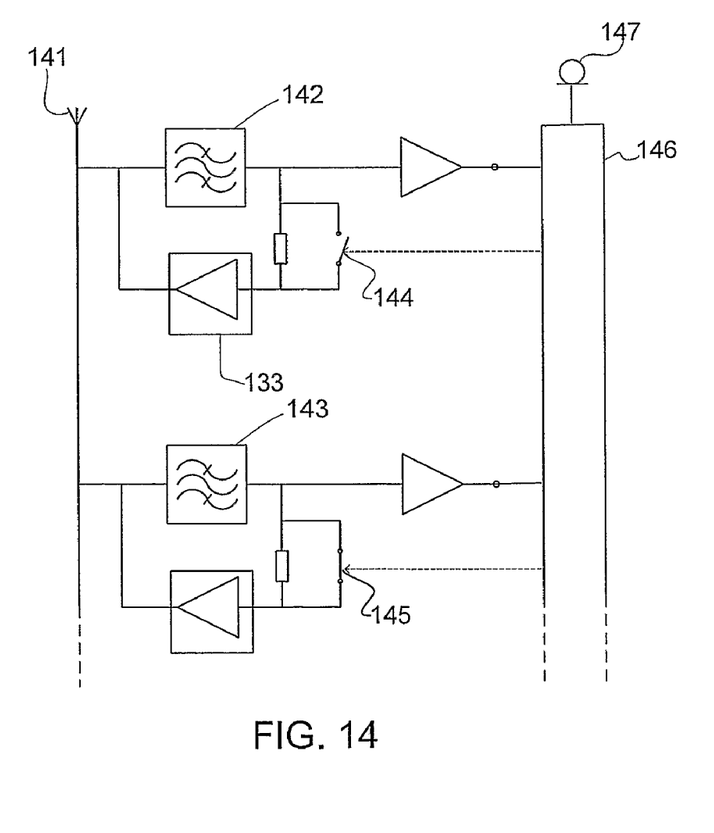
FIG. 14 is a schematic diagram of a device comprising several regenerative circuits.

FIG. 14 shows another embodiment, wherein several circuits 142, 143 are connected to the same antenna 141. Each circuit comprises a deactivation switch 144 and 145, respectively. Two circuits 142, 143 are shown in FIG. 14, but any number can be used. The first circuit 142 is tuned to the frequency f81 corresponding to a logical "one" and the second regenerative circuit 143 is tuned to the frequency f82 corresponding to a logical "zero". A control circuit 146 controls deactivation switches 144 and 145 of each circuit in dependence on a signal received by a sensor 147.

The operation for polling the tag is as follows. The reader has identified the tag in any manner as described above. The tag is polled at a frequency determined in advance, such as frequency f1 indicated in FIG. 8. The control circuit operates switches 144 and 145 in dependence of the most significant bit of the sensor value of sensor 147, which may be a temperature sensor having an eight bit value to be transmitted to the reader. If the most significant bit is "one", switch 144 is closed and switch 145 is opened and if the most significant bit is "zero", switch 145 is closed and switch 144 is opened. Then, the reader transmits a polling signal at frequency f1. If the most significant bit is "one", oscillation circuit 142 starts to oscillate at frequency f81. If the most significant bit is "zero", oscillation circuit 143 starts to oscillate at frequency f82. The reader detects the response. Then, the control circuit disables the oscillations, and controls switches 144 and 145 according to the next bit in the signal and the reader sends a second polling signal at frequency f1, and so on. After eight polling signals, eight bits of the temperature signal has been transmitted to the reader.

The same principle can be used with a single circuit, wherein the control circuit controls a varactor or similar device in dependence on the sensor signal.

The embodiment with several receivers can be used with advantage also during identification as indicated above. Such an embodiment can have four circuits each tuned to the frequencies f0+Δf1, f16+Δf1, f20+Δf1 and f21+Δf1, as described above in connection with FIG. 11. If all four circuits are trigged in a sequence, the reader has received the identity of that tag, and can continue to poll the tag, for example as described above.

The device according to any of the embodiments described above can be manufactured in a CMOS technology. However, other technologies may also be used, such as discrete components, for example MOSFET transistors, having a very low power consumption in the low-power mode.

Figure 15:
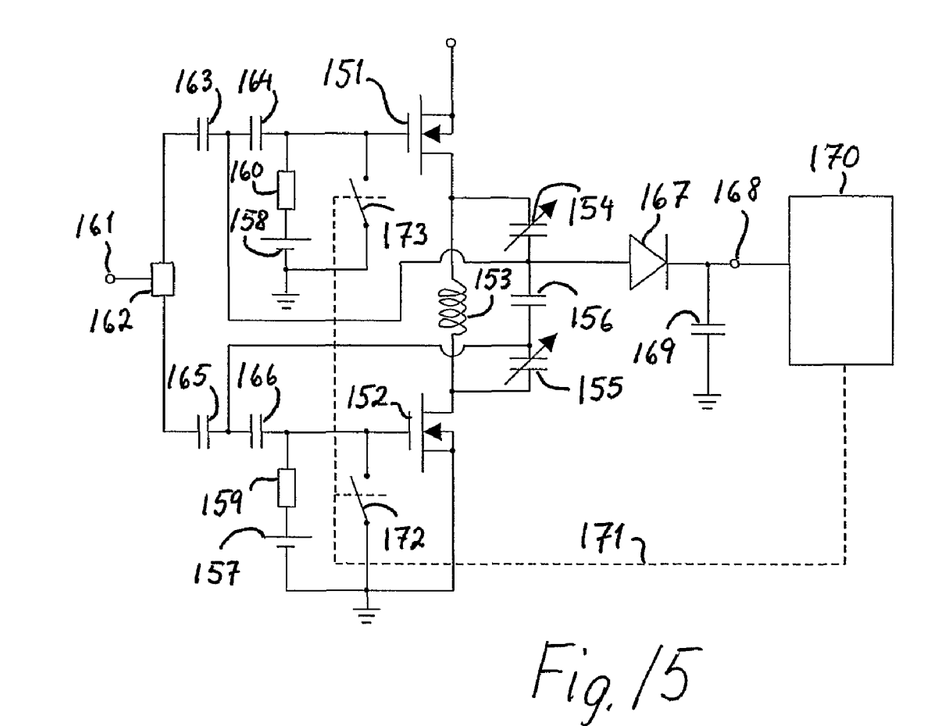
FIG. 15 is a detailed schematic diagram similar to FIG. 6 of another embodiment.

FIG. 15 is a circuit diagram of another embodiment of the oscillation circuit. The circuit is similar to the circuit shown in FIG. 6, but is arranged in a balanced manner. The circuit requires only one inductor, which makes it more suitable for being embodied on a silicon chip with all components on the chip.

The oscillation circuit comprises a first PMOSFET transistor 151 and a second NMOSFET transistor 152. Between the drains of the transistors, an inductor 153 is connected. Parallel with the inductor, three capacitors 154, 155, 156 are connected, mutually in series. The gates of the transistors are fed with a gate voltage via two voltage sources 157, 158 and two resistors 159, 160 so that the transistors normally are in an area below the normal operation area of the transistor, in a sub-threshold area. The transistors are connected to an antenna terminal 161 via a balun 162 which converts the unbalanced antenna signal to a balanced signal and via each two isolation capacitors 163, 164, 165, 166. A diode 167 provides a control circuit 170 with an output signal via output terminal 168 and output capacitor 169. A control line 171 controls two reset switches 172 and 173. The operation is similar to the circuit in FIG. 6.

The circuit operates as a combination of a bistable and astable multivibrator. In the first mode of operation, the circuit is meta-stable, meaning that a trigger signal having sufficient power in the relevant frequency band will pass the circuit into the second mode of operation. In the second mode of operation, the circuit operates like an astable multivibrator, oscillating at a specific frequency. The oscillations will continue until some outer event stops the oscillations and return the circuit to the first meta-stable mode.

The embodiments may be embedded in a computer program product, which enables implementation of the method and functions described herein. The invention may be carried out when the computer program product is loaded and run in a system having computer capabilities. Computer program, software program, program product, or software, in the present context mean any expression, in any programming language, code or notation, of a set of instructions intended to cause a system having a processing capability to perform a particular function directly or after conversion to another language, code or notation.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be emphasized that the singular forms "a", "an" and "the" as used herein are intended to comprise the plural forms as well, unless expressly stated otherwise. It will be further understood that the terms "includes," "comprises," "including" and/or "comprising," when used in this specification, is taken to specify the presence of stated features, integers, steps, operations, elements, and/or components, but do not preclude the presence or addition of one or more other features, integers, steps, operations, elements, components, and/or groups thereof.

The present invention has been described above with reference to specific embodiments. However, other embodiments than the above described are equally possible within the scope of the invention. Different method steps than those described above, performing the method by hardware or software or a combination of hardware and software, may be provided within the scope of the invention. The different features and steps of the invention may be combined in other combinations than those described. The different embodiments described above do not limit the scope of the invention, but the scope of the invention is only limited by the appended patent claims.

The invention claimed is:

1. A method of operating an electronic device, comprising:
    initially operating the device in a meta-stable, non-oscillating, first mode of operation draining practically no current from a power supply;
    operating the device in an oscillating, second mode of operation, in which the device is instable and wherein the device oscillates at a predetermined oscillation frequency at a higher power dissipation;
    transferring the device from said first mode of operation to said second mode of operation by means of a signal having a predetermined signal frequency and power level and being input to an input terminal of the device via an antenna;
    terminating the second mode of operation and transferring said device to said meta-stable, first mode of operation in response to a reset circuit.

2. The method according to claim 1, wherein said transferring of the device from said first mode of operation to said second mode of operation takes place after a latency period after inputting said signal.

3. The method according to claim 1, wherein said signal frequency is offset from the oscillation frequency of the device.

4. The method according to claim 1, wherein the device is in a sub-threshold area of operation in the meta-stable, first mode of operation.

5. The method according to claim 1, wherein the oscillation frequency is adjustable.

6. The method according to claim 1, further comprising:
    activation of a control circuit at the transferring from the first mode of operation to the second mode of operation.

7. The method according to any one of the previous claims, further comprising:
    activation of a control circuit at the transferring from the first mode of operation to the second mode of operation.

8. An electronic device, comprising:
    an amplification member and a filter member connected to form an oscillation circuit,
    a bias circuit for maintaining the oscillation circuit in an inactive, meta-stable, non-oscillating first mode of operation, having low power dissipation,
    an input circuit for inputting a signal via an antenna to said amplification member for transferring said device into a second mode of operation, in which the device is instable and has a higher power dissipation wherein the device oscillates at a predetermined oscillation frequency;
    a reset circuit for stopping the oscillations and resetting said device to said first mode of operation.

9. The device according to claim 8, wherein the filter member comprises at least one inductor and at least one capacitor.

10. The device according to claim 8, wherein said filter member is adjustable.

11. The device according to claim 10, wherein the device is used in an article surveillance system comprising a reader and several identification tags.

12. The device according to claim 8, further comprising a control circuit adapted to be activated at the transferring from said first mode to said second mode.

13. The device according to claim 12, wherein said control circuit controls the reset circuit.

14. The device according to claim 12, wherein at least a second electronic device is connected to the control circuit.

15. The device according to claim 14, wherein said second electronic device has a different oscillation frequency than the first electronic device.

16. A method of operating an electronic device, comprising:
- initially operating the device in a meta-stable, first mode of operation having low power dissipation;
- sending a signal for a short time period by a reader, said signal having a specific frequency;
- transferring the device from said first mode of operation to an oscillating, second mode of operation, in which the device is instable and wherein the device oscillates at a predetermined oscillation frequency, by means of said signal having a predetermined signal frequency and higher power level and being input to an input terminal of the device via an antenna;
- listening by said reader for signals having the same or similar frequency and if such a signal is sensed after the reader signal has ceased, this indicates that an electronic device responsive to substantially that frequency is present within the range of the reader, and
- terminating the second mode of operation and transferring said device to said meta-stable, first mode of operation by a reset circuit.

17. The method according claim 16, wherein the device in the meta-stable, first mode of operation operates in a sub-threshold area of the operational diagram of a transistor comprised in the electronic circuit, wherein practically no power consumption takes place.

18. An electronic device, comprising:
- an amplification member and a filter member connected to form an oscillation circuit,
- a bias circuit for maintaining the oscillation circuit in an inactive, meta-stable, first mode of operation, having low power dissipation,
- a reader adapted to send a signal having a specific frequency for a short time period;
- an input circuit for inputting a signal via an antenna to said amplification member for transferring said device into a second mode of operation, in which the device is instable and has a higher power dissipation wherein the device oscillates at a predetermined oscillation frequency;
- said reader being adapted to listen for signals having the same or similar frequency and if such a signal is sensed after the reader signal has ceased, this indicates that an electronic device responsive to substantially that frequency is present within the range of the reader.

* * * * *